United States Patent [19]

Batts

[11] 4,138,063
[45] Feb. 6, 1979

[54] HYDRAULICALLY-OPERATED FERTILIZER AND CHEMICAL-SPREADING BOOM

[76] Inventor: John R. Batts, R.R. 2, Jamestown, Ind. 46147

[21] Appl. No.: 781,139

[22] Filed: Mar. 25, 1977

[51] Int. Cl.² ............................................. B05B 1/20
[52] U.S. Cl. ................................................ 239/168
[58] Field of Search ....................... 239/164, 166–168

[56] References Cited

U.S. PATENT DOCUMENTS

| 2,725,256 | 11/1955 | Devost et al. | 239/167 |
| 3,887,132 | 6/1975 | Widmer | 239/166 |
| 3,913,836 | 10/1975 | Stevenson | 239/166 |
| 3,927,832 | 12/1975 | Robinson et al. | 239/168 |

FOREIGN PATENT DOCUMENTS

| 1524338 | 5/1968 | France | 239/164 |

Primary Examiner—Robert W. Saifer
Attorney, Agent, or Firm—Woodard, Weikart, Emhardt & Naughton

[57] ABSTRACT

A spray boom apparatus for attachment to a chemical and fertilizer-spreading farm vehicle for spraying chemicals over crops and farmland. The apparatus comprises a pair of spray booms which are hinged to a support rack. Each boom is further connected to the support rack by means of a hydraulic cylinder which allows each boom to be positioned in an outwardly-projecting dispensing position. The support rack is hinged to a stationary brace which is attached to the rear of the farm vehicle. A further hydraulic cylinder is connected between the support rack and the stationary brace. This further cylinder allows each boom to be tilted simultaneously to a closed position above the side windows of the cab of the vehicle when the booms are not in use.

3 Claims, 7 Drawing Figures

HYDRAULICALLY-OPERATED FERTILIZER AND CHEMICAL-SPREADING BOOM

BACKGROUND OF THE INVENTION

1. Field of the Invention

This invention relates in general to fertilizer and chemical-spreading systems for use with farm vehicles.

2. Description of the Prior Art

Fluid sprayer systems which attach to farm vehicles are well known to the agricultural industry. The typical construction is to attach a pair of spray booms to the rear of a farm vehicle, connect chemical tank hoses to spray nozzles on each boom, and dispense fluid fertilizer and chemicals from the chemical tank through the spray nozzles to crops and farmland. The booms are attached to the farm vehicle so that when in use, the booms extend in a horizontal position a few feet above the ground in a vertical plane which is perpendicular to the direction of travel of the truck.

The patents of Loeffler, U.S. Pat. No. 3,580,505 and Hall, U.S. Pat. No. 3,972,476 disclose spray boom assemblies of the type described. One consideration with such devices is what to do with the booms when they are not horizontally extended and in use. The patents of Holloway, U.S. Pat. No. 3,587,624 and Robinson et al., U.S. Pat. No. 3,927,832 disclose one means of storage for spray booms when they are not in use. In Holloway and Robinson, the booms are hinged to a supporting structure which is attached to a truck. The devices disclosed in these two patents include means to draw the booms inwardly to a position adjacent to the sides of the truck. One disadvantage with this mode of not-in-use storage is that the side windows of the cab of the truck are blocked, thereby preventing ingress to or egress from the cab. Another disadvantage is that when the spraying system is turned off, some of the chemical remains in the hose lines. Thus when the booms are positioned adjacent to the sides of the truck, this chemical which remains will drain out of the spraying nozzles onto the truck. Since most of the agricultural chemicals used are caustic, this drainage will result in corrosion to the metal of the truck.

The drawbacks of having the side windows blocked by the booms when in a closed position and the drainage of chemicals onto the truck are resolved by the devices disclosed by the patents of Widmer, U.S. Pat. No. 3,887,132 and Jackson, U.S. Pat. No. 3,902,667 which include means to individually raise each boom to an elevated position above the cab side windows. This elevating, as well as the closing of the booms inwardly towards the side of the truck, is performed by means of hydraulic cylinders in cooperation with mechanical linkages.

One further disadvantage of all of the prior art which has been referenced is that the mechanisms to accomplish the closing and elevating are complex and involve intricate linkages and mechanical connections. Consequently, when the vehicle is driven with the spray booms extended, shock and vibration will be encountered and subject the spraying system to mechanical failures resulting in downtime.

SUMMARY OF THE INVENTION

One embodiment of the present invention is a spray boom apparatus for attachment to a vehicle for dispensing fertilizer and chemicals. The apparatus comprises a support rack, means to attach the support rack to the vehicle and means to pivot the support rack. The apparatus further comprises a pair of chemical-dispensing booms hinged to the support rack for movement to and from an outwardly-projecting dispensing position and means for moving the booms relative to the support rack to and from the dispensing position. The attaching means comprises a stationary brace attached to the vehicle, the support rack being hinged to the stationary brace, and the pivoting means comprises a fluid power cylinder attached between the support rack and the stationary brace. The pivoting and moving means being operable to position the booms above the side windows of a cab of the vehicle to which the apparatus is attached.

One object of the present invention is to provide a simplified mechanism and an improved method for tilting fertilizer and chemical-spraying booms above the side windows of the cab of a farm vehicle.

Related objects and advantages of the present invention will be apparent from the following description.

DESCRIPTION OF THE PREFERRED EMBODIMENT

Figure 1:
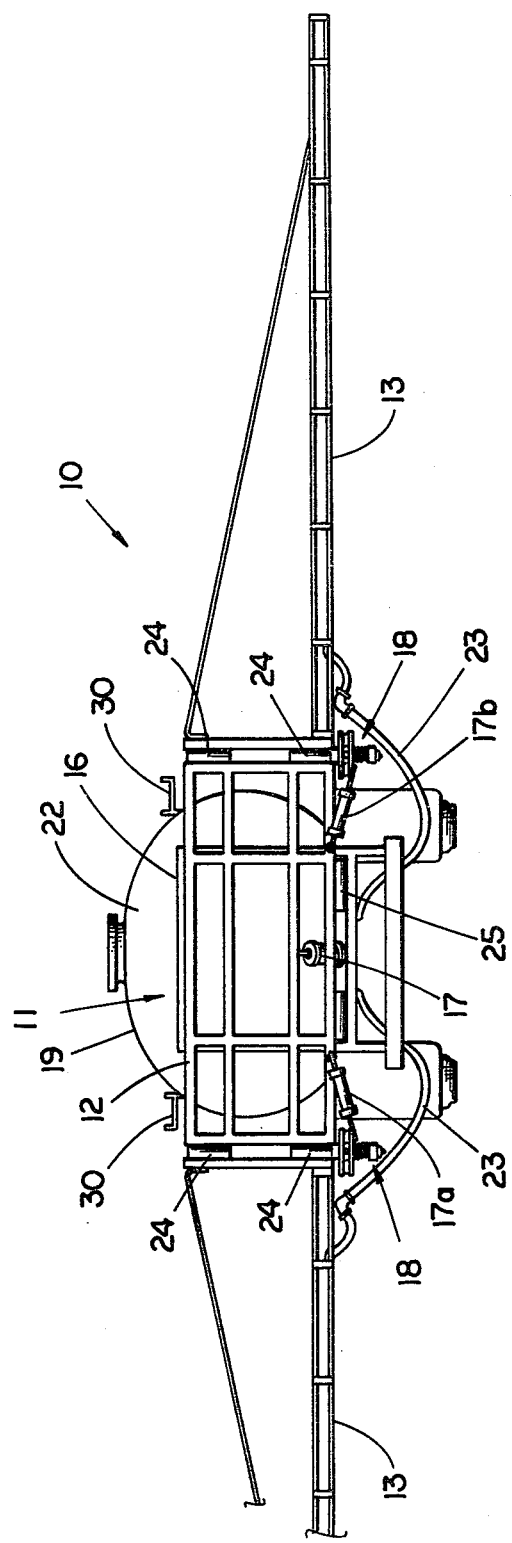
FIG. 1 is an elevational view of a spray boom apparatus as attached to a truck.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
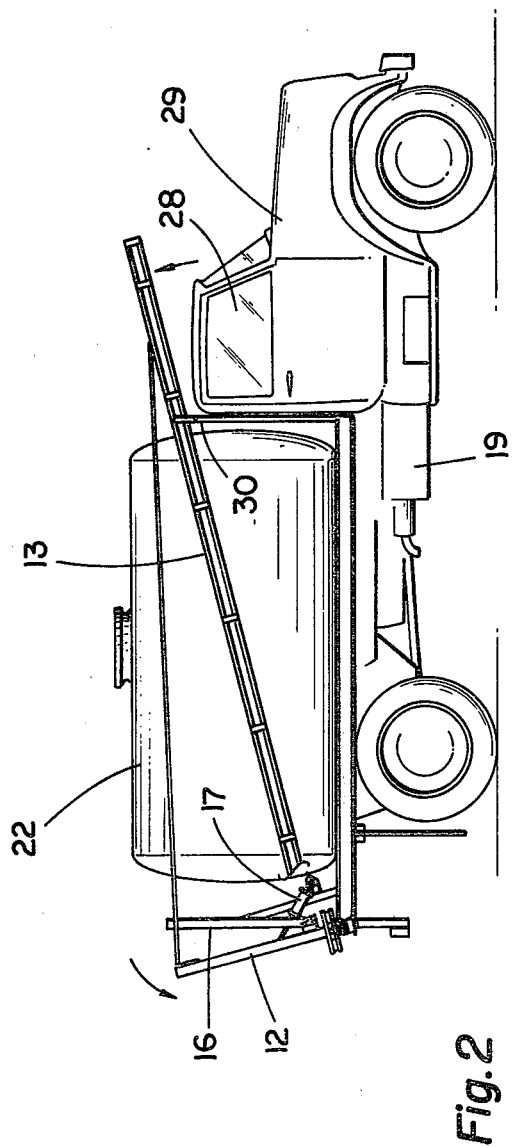
FIG. 2 is a side view showing a portion of the FIG. 1 apparatus in a tilted position.
Figure 3:
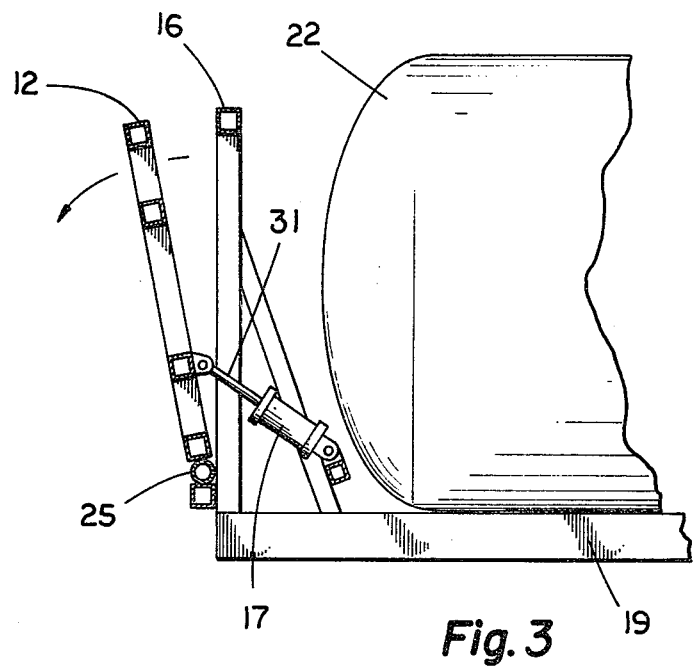
FIG. 3 is a detailed side view of a pivoting mechanism which comprises a portion of the FIG. 1 apparatus.

One embodiment of the present invention is illustrated by FIG. 1 which shows a spray boom apparatus 10 comprising a frame assembly 11, a support rack 12, chemical-dispensing booms 13, a stationary brace 16, hydraulic cylinders 17–17a–17b and break-back mechanisms 18. Spray boom apparatus 10 is attached to a farm vehicle 19 which may be any suitable vehicle on which a chemical reservoir tank 22 can be mounted. Although farm vehicle 19 is shown in FIGS. 1, 2 and 3 as a chemical tank truck, it is to be understood that the spray boom apparatus 10 is equally applicable for mounting to and use with a tractor. Included with farm vehicle 19 and chemical reservoir tank 22 is a pumping mechanism (not shown) for drawing chemical from tank 22. Connecting this pumping mechanism with the spray booms 13 are a pair of flexible hoses 23. The hoses 23 are constructed of a material suitable for transferring agricultural fertilizer and chemicals. These flexible hoses 23 connect the pumping mechanism associated with chemical reservoir tank 22 to one end of each boom 13.

Stationary brace 16 may be attached to farm vehicle 19 by any conventional method, such as, for example, by bolting or welding, so long as brace 16 is rigidly fixed to the rear of the vehicle. Support rack 12 which extends beyond each side of stationary brace 16 in a horizontal direction, is hinged to stationary brace 16 along the lower edge of rack 12 by means of base hinge 25. Base hinge 25 which is shown as constructed of two sections could also be a single section extending the full width of stationary brace 16. Hinge 25 is an enclosed, pin-type hinge and allows 180 degrees of movement of support rack 12 with respect to stationary brace 16 solely about the generally horizontal axis of this hinge arrangement. Chemical-dispensing booms 13 are attached to support rack 12 by means of two pairs of vertical, enclosed, pin-type side hinges 24 for movement of each boom relative to the support rack solely about the generally vertical axis of each corresponding hinge 24.

Chemical-dispensing booms 13 can be laterally extended to a horizontal in-line position perpendicular to the direction of travel of farm vehicle 19, as shown in FIG. 1, as well as drawn inwardly toward the sides of farm vehicle 19. This inward movement toward the sides of vehicle 19 is accomplished by means of hydraulic cylinders 17a and 17b. These cylinders 17a, 17b are attached on each side of support rack 12 between support rack 12 and break-back mechanism 18. Break-back mechanisms 18 are attached to and cooperate with dispensing booms 13 to effect a horizontal hinged motion in response to hydraulic cylinders 17a and 17b. In addition, break-back mechanisms 18 provide a safety device when the farm vehicle 19 is traveling across the ground and the chemical-dispensing booms 13 are positioned in an outwardly-projecting dispensing position. If an obstruction is encountered by either boom, break-back mechanism 18 permits the boom to collapse rearwardly, opposite to the direction of travel of vehicle 19.

Once chemical-dispensing booms 13 have been drawn inwardly, adjacent to the sides of the farm vehicle 19, they will be in a position which obstructs side windows 28 of cab 29 of farm vehicle 19 as shown in FIG. 2. In order to permit access to the interior of cab 29, chemical-dispensing booms 13 can be tilted about a generally-horizontal axis to an elevation sufficiently above the top surface of cab 29 thereby allowing entrance to and exit from the cab 29 of the vehicle 19 without interference with the booms 13. This tilting is performed by means of base hinge 25 and hydraulic cylinder 17 which is attached between support rack 12 and stationary brace 16. Hydraulic cylinder 17 is centrally positioned between the pair of chemical-dispensing booms 13 such that the weight of the support rack 12 and both booms 13 is equally distributed on opposite sides of hydraulic cylinder 17. Since both booms 13 are attached by side hinges 24 to support rack 12 (see FIG. 1), the operation of hydraulic cylinder 17 rearwardly pivoting support rack 12 permits both booms 13 to be tilted simultaneously. Once tilted to the elevated position above the side windows 28 of cab 29, the booms 13 can be rested against brackets 30 (also shown in FIG. 1) which are positioned between the rear of cab 29 and chemical reservoir tank 22 and above the side windows 28 of the cab 29. Once booms 13 are above and inside the outer edges of brackets 30, the booms 13 can be lowered onto brackets 30. When booms 13 apply a slight pressure on brackets 30, the booms are moved outwardly until the corresponding outer edge of each bracket 30 is contacted. In this manner the booms can effectively be locked into and retained by brackets 30 and will not be susceptible to damage due to a rough ride. Inasmuch as each bracket 30 includes an upstanding inner edge, an upstanding outer edge and a corresponding cross member therebetween, the booms can either be moved inwardly or outwardly to contact an upstanding edge for locking the boom into a retained position. Each hydraulic cylinder 17, 17a and 17b has a bypass relief valve which prevents booms 13 from pressing too hard on brackets 30. The arrows show the direction of movement of support rack 12 and chemical-dispensing booms 13.

FIG. 3 shows a detailed view of the support rack and stationary brace as they are attached to one another by means of base hinge 25 and hydraulic cylinder 17. The view of FIG. 3 shows only a portion of farm vehicle 19, a portion of chemical reservoir tank 22, and the booms 13 have been detached from support rack 12 for purposes of drawing clarity. Actuation of cylinder 17 causes piston 31 of cylinder 17 to extend outwardly from the body of cylinder 17 in a longitudinal direction coincident with the axis of cylinder 17. This outward motion applies a force on support rack 12 causing it to pivot away from farm vehicle 19 and toward the ground as shown by the arrow. When the piston 31 is retracted into cylinder 17, support rack 12 will be pulled up against stationary brace 16. This type of pivoting mechanism (hinge 25 and cylinder 17) involves a minimum number of parts and represents a very reliable mechanical connection.

Figure 4:
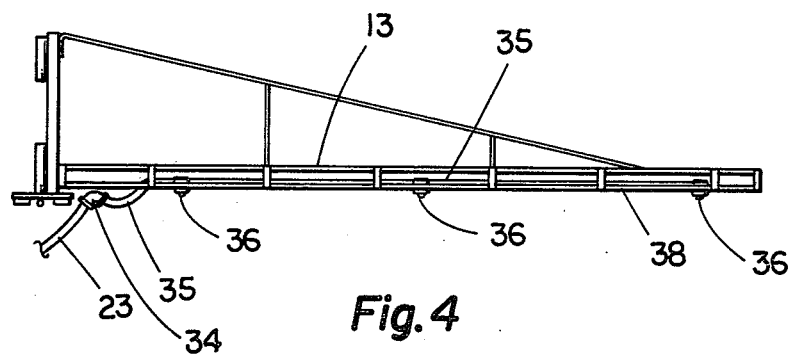
FIG. 4 is an elevational view of one boom of the FIG. 1 apparatus.

FIG. 4 is an elevational view of one boom 13 shown disconnected from support rack 12 and showing in greater detail hose 23 and its connection to boom 13. Although hose 23 can be a single length extending from the pumping mechanism to one end of boom 13 and then along the length of boom 13, it is preferred to have hose 23 a shorter length and connected to a second length of hose 35 by means of connector 34. This second length of hose 35 is secured to dispensing boom 13 and to a series of nozzle attachments 36 which are attached to the lower frame portion 38 of boom 13. The nozzle attachments 36 actually intersect with hose 35 so that chemicals being pumped from chemical reservoir tank 22 pass through hose 23, through connector 34, and will be dispensed in a spraying fashion by each of the nozzle attachments 36. With this two-hose type of construction, booms 13 can be detached from the spray boom apparatus 10 for replacement or servicing. In addition, hose 23 can be disconnected if it needs to be replaced without having to disrupt hose 35 and the nozzle attachments 36 which are attached to spray boom 13.

Figure 5:
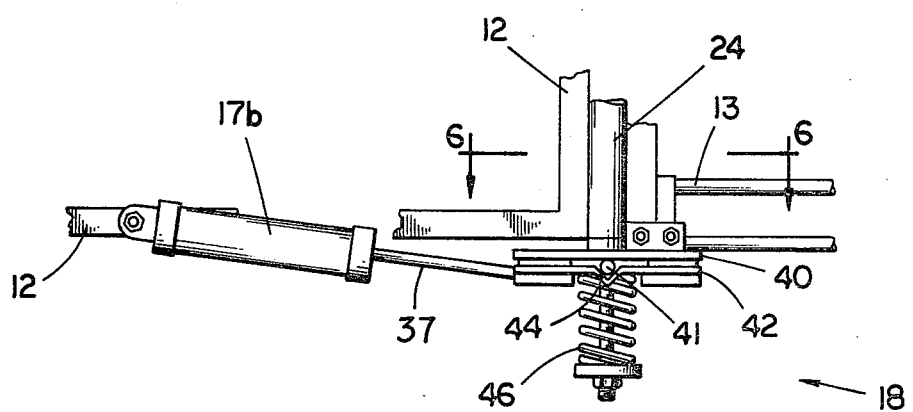
FIG. 5 is a detailed elevational view of a positioning mechanism which comprises a portion of the FIG. 1 apparatus.

FIG. 5 shows a detailed elevational view of one break-back mechanism 18 which is attached between support rack 12 and chemical-dispensing boom 13. Break-back mechanism 18 consists of a pair of circular metal plates which are aligned one on top of the other. Bottom plate 42 is attached to piston 37 of hydraulic cylinder 17b. The other end of hydraulic cylinder 17b is pinned to support rack 12. Top plate 40 also includes a group of four bars 41 which are spaced 90 degrees apart, extend radially outward and are welded to plate 40. Spring 46 is a coil spring which exerts an upward force on the underside of plate 42 causing plates 42 and 40 to be pressed together in a spring-loaded manner. Bottom plate 42 includes a group of four V-grooves 44 spaced 90 degrees apart and each V-groove opening faces top plate 40. As the piston 37 of hydraulic cylinder 17b moves between an extended and a retracted position, boom 13 moves between its outwardly-extending dispensing position as shown in FIG. 1 and a closed position adjacent the sides of the vehicle, respectively. Break-back mechanism 18 pivotally moves as a single member during this boom travel by means of side hinge 24 and by each bar 41 being positioned within a corresponding V-groove 44. If an obstruction is encountered by one of the outwardly-extending spray booms while vehicle 19 is moving, boom 13 (rigidly attached to top plate 40) will be forced rearwardly. However, with piston 37 extended, bottom plate 42 will not be able to turn and with sufficient force being exerted, each bar 41 will ride up and out of its corresponding V-groove 44 pushing plate 42 downwardly to compress spring 46. As top plate 40 rotates in a clockwise direction, bottom plate 42 will remain stationary with respect to piston 37 thus allowing boom 13 continued rearward movement without damaging hydraulic cylinder 17b. Once the obstruction is removed, boom 13 can be manually pushed back to its outwardly-extending dispensing position such that bars 41 will again seat within V-grooves 44.

Figure 6:
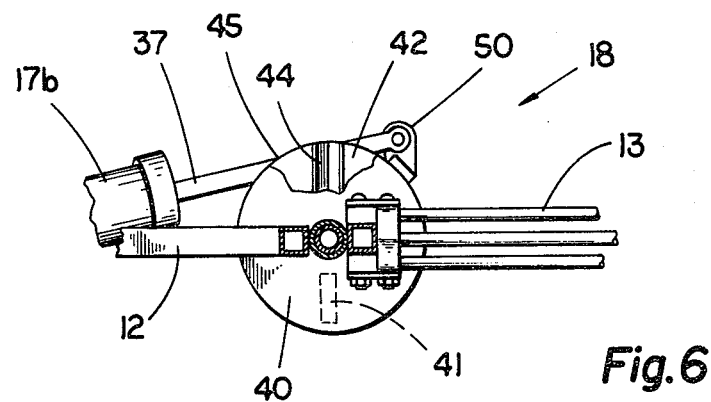
FIG. 6 is a fragmentary view taken along line 6—6 of FIG. 5.

FIG. 6 shows a top view of the break-back mechanism 18 with dispensing boom 13 and cylinder piston 37 in a laterally-extended position. The linkage design of bottom plate 42 with cylinder piston 37 permits approximately 90 degrees of lateral movement by chemical-dispensing boom 13 relative to support rack 12 in response to the extension and retraction of cylinder piston 37 of hydraulic cylinder 17b. Bottom plate 42 consists of hydraulic arm 50 to which piston 37 attaches and plate portion 45 which includes V-grooves 44. For drawing clarity, only one bar 41 and only one V-groove 44 are shown.

Figure 7:
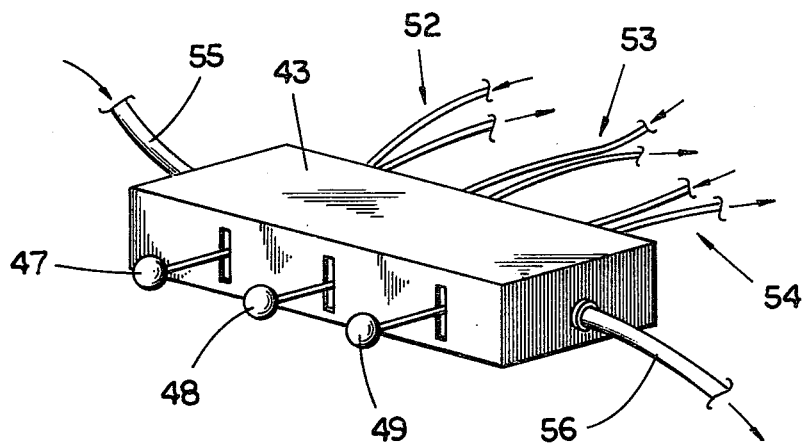
FIG. 7 is a perspective view of the controls associated with the FIG. 1 apparatus.

FIG. 7 shows a perspective view of control box 43 which may be positioned within the cab 29 of farm vehicle 19. Box 43 includes three levers, 47, 48, and 49, which are individually operable to control the extension and retraction of the pistons associated with hydraulic cylinders 17, 17a and 17 b, respectively. Levers 47, 48, and 49 are also each associated with a pair of hydraulic lines 52, 53 and 54, respectively, which lead from control box 43 to their corresponding hydraulic cylinders 17, 17a and 17b. Each pair of lines 52, 53 and 54 includes one out line for delivery of oil to its corresponding hydraulic cylinder and one return line from the cylinder. The oil which travels through lines 52, 53 and 54 is supplied to control box 43 by means of input line 55. Oil which is returned to control box 43 by the one return line in each pair of lines 52, 53 and 54 is removed from box 43 by output line 56. Lines 55 and 56 connect to an oil reservoir and associated pump which are not shown. A suitable hydraulic device for this system is a model DC 3T 22 power unit manufactured by Stone Hydraulics of Rockford, Ill.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A spray boom apparatus for attachment to a chemical-dispensing vehicle having a cab with side windows, said apparatus comprising:

a stationary brace suitably designed and arranged for rigidly mounting to the rear of said vehicle;

a support rack attached to said stationary brace by means of a generally horizontal hinge pin arrangement;

a pair of chemical-dispensing booms vertically hinged to said support rack for movement of said booms relative to said support rack solely about a generally-vertical axis to and from an outwardly-projecting dispensing position;

means for moving said booms relative to said support rack solely about said generally-vertical axis to and from said dispensing position; and power cylinder means connected between said support rack and said stationary brace for pivoting said support rack downwardly and rearwardly solely about a generally-horizontal axis, said moving means and said pivoting means being operable to position said chemical-dispensing booms sufficiently above the side windows of the cab to allow entrance to and exit from the cab without interference by said chemical-dispensing booms.

2. The spray boom apparatus of claim 1 wherein said moving means includes two power cylinders, there being a different one of said two power cylinders associated with each of said booms for controlling movement of said booms about said generally-vertical axis and wherein each of said two power cylinders and said power cylinder means are all operable independently of each other.

3. The spray boom apparatus of claim 2 which further includes a pair of bracket members disposed on opposite sides of said vehicle, each of said bracket members having an upstanding inner edge portion, an upstanding outer edge portion and a cross member therebetween, said edge portions being suitably spaced to permit retention of a corresponding boom therebetween by moving said boom into contact with said cross member and into contact with either edge portion.

* * * * *